United States Patent
Singh et al.

(10) Patent No.: US 11,902,621 B2
(45) Date of Patent: Feb. 13, 2024

(54) SYSTEM AND METHOD FOR MEDIA STREAM FILLER DETECTION AND SMART PROCESSING FOR PRESENTATION

(71) Applicant: ARRIS Enterprises LLC, Suwanee, GA (US)

(72) Inventors: Virendra Singh, Bangalore (IN); Lakshmi Arunkumar, Bangalore (IN); Murali S. Sahasranaman, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 242 days.

(21) Appl. No.: 16/223,086

(22) Filed: Dec. 17, 2018

(65) Prior Publication Data

US 2020/0196010 A1  Jun. 18, 2020

(51) Int. Cl.
*H04N 21/454* (2011.01)
*H04N 21/258* (2011.01)

(52) U.S. Cl.
CPC ..... *H04N 21/454* (2013.01); *H04N 21/25866* (2013.01)

(58) Field of Classification Search
CPC ............... H04N 5/44543; H04N 5/454; H04N 21/25866; H04N 2005/44565; H04N 21/482; H04N 21/454; H04N 21/45457; H04N 21/44008; H04N 21/440245; H04N 21/23611; H04N 21/8456
See application file for complete search history.

(56) References Cited

U.S. PATENT DOCUMENTS

| | | | | |
|---|---|---|---|---|
| 5,892,633 | A * | 4/1999 | Ayres | G06F 3/0682 360/73.08 |
| 2003/0058887 | A1* | 3/2003 | Dworkin | H04N 21/23611 370/470 |
| 2008/0097970 | A1* | 4/2008 | Olstad | G06F 16/78 |
| 2010/0146139 | A1* | 6/2010 | Brockmann | H04N 21/2662 709/231 |
| 2020/0151460 | A1* | 5/2020 | Korenwaitz | G06K 9/00751 |
| 2021/0135996 | A1* | 5/2021 | Back | H04L 47/54 |

FOREIGN PATENT DOCUMENTS

| | | |
|---|---|---|
| WO | 2014122141 A1 | 8/2014 |
| WO | 2016086100 A1 | 6/2016 |

* cited by examiner

*Primary Examiner* — Ngoc K Vu
(74) *Attorney, Agent, or Firm* — Panitch Schwarze Belisario & Nadel LLC

(57) ABSTRACT

The customer premises equipment apparatus includes a communication component, a determining component and a filtering component. The communication component pulls a first chunk of headend guide data from a headend guide data provider using HTTP streaming. The first chunk of headend guide data contains a plurality of frames, some of which may be filler frames. The determining component determines whether at least one of the frames within the first chunk of headend guide data includes filler frames. The filtering component removes the frames that correspond to filler frames.

19 Claims, 6 Drawing Sheets

| Time in Seconds | 0 | 1 | 2 | 3 | 4 | 5 | 6 | 7 | 8 | 9 | 10 | 11 | 12 | ... |
|---|---|---|---|---|---|---|---|---|---|---|---|---|---|---|
| Content from Headend | HE Filler | HE Filler | HE Filler | HE Filler | HE Filler | HE Filler | HE Filler | HE Filler | | | | | | ... |
| CPE 404 Action | Acquire | Acquire | Acquire | Acquire | Acquire | Acquire | Buffer | Buffer | | | | | | ... |
| CPE 404 Display | CPE Filler | CPE Filler | CPE Filler | CPE Filler | CPE Filler | CPE Filler | CPE Filler | CPE Filler | Guide | Play | Guide | Play | Guide | ... |
| CPE 406 Action | Acquire | Acquire | Acquire | Acquire | Acquire | Acquire | Buffer | Buffer | HE Filler | HE Filler | | | | ... |
| CPE 406 Display | CPE Filler | CPE Filler | CPE Filler | CPE Filler | CPE Filler | CPE Filler | CPE Filler | CPE Filler | Play | Guide | Play | Guide | Play | ... |
| | CPE Filler | CPE Filler | CPE Filler | CPE Filler | CPE Filler | CPE Filler | CPE Filler | CPE Filler | Play | Play | Play | Play | Play | ... |
| | CPE Filler | CPE Filler | CPE Filler | CPE Filler | CPE Filler | CPE Filler | CPE Filler | CPE Filler | Guide | Guide | Guide | Guide | Guide | ... |

502 → Time in Seconds
504 → Content from Headend
506 → CPE 404 Action
508 → CPE 404 Display
510 → CPE 406 Action
512 → CPE 406 Display

SYSTEM AND METHOD FOR MEDIA STREAM FILLER DETECTION AND SMART PROCESSING FOR PRESENTATION

BACKGROUND

Embodiments of the invention relate to devices and methods for using a customer premises equipment (CPE), for example in a cable television system, to remove filler frames in media streams transmitted by a headend provider. One example of a media stream with filler frames is a headend-generated user guide stream. Another example is a headend-provided targeted ad stream.

Currently, there are various models of CPE in the field, varying from very old to current generation models. Each generation of CPE may take a different amount of time to acquire and parse a new media stream from a headend provider, and some older devices may cause some portion of the stream to be lost in processing. Since for some uses, such as those mentioned above, the media stream needs to be guaranteed, filler frames are added to the beginning of those media streams to prevent the desired frames from being lost. These filler frames tend to be perceived by an end user as slowness and lag which is highly undesirable.

What is needed is a system and method for producing a more desirable experience when accessing headend-generated media content.

SUMMARY

Aspects of the present invention are drawn to a customer premises equipment being provided for use with a headend provider of a media stream with leading filler frames. The customer premises equipment includes a communication component, a determining component and a filtering component. In one embodiment, the communication component tunes to an incoming stream, then buffers multiple frames of that stream. The determining component determines whether at least one frame of the plurality of frames is associated with filler. The filtering component removes the first frame of headend media stream when the first frame of headend media stream is associated with filler. In another embodiment, the communication component pulls a first chunk of a media stream from a headend stream provider. The first chunk of the media stream comprises a plurality of frames. The determining component determines whether at least one frame of the plurality of frames is associated with filler. The filtering component removes at least a first frame of the media stream when the frame is associated with filler.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 5 illustrates a chart of a guide frame presentation sequence in accordance with a second aspect of the present invention;

DETAILED DESCRIPTION

The present invention provides system, apparatus and method for removing filler frames from media streams provided by a headend media stream provider. The customer premises equipment (CPE) receives or retrieves media streams from a headend media stream provider, where the media stream will be used to construct video content, such as a user guide, for an end user.

In accordance with aspects of the present invention, a CPE is provided that is able to remove filler frames as part of a process of preparing a media stream for display to an end user. The first part of the process is acquiring content from the headend media stream provider. The second part includes the detection of the filler frames, followed by the application of a corrective method, which is the third part in the process. Finally, the process is completed in the fourth part by presenting the media stream to an end user without any filler frames.

In accordance with a first aspect of the present invention, a CPE is provided for use with a determining component which is able to read the properties of each chunk of headend guide data provided by the headend guide data provider. In this case, the determining component is able to read the properties of each chunk of headend guide data to determine whether or not the frame is a filler frame. If it is determined that the frame is a filler frame, it is removed by a filtering component. In this manner, filler frames can be removed and the desired content may be displayed more quickly.

Aspects of the present invention will now be described with reference to FIGS. 1-6.

Figure 1:
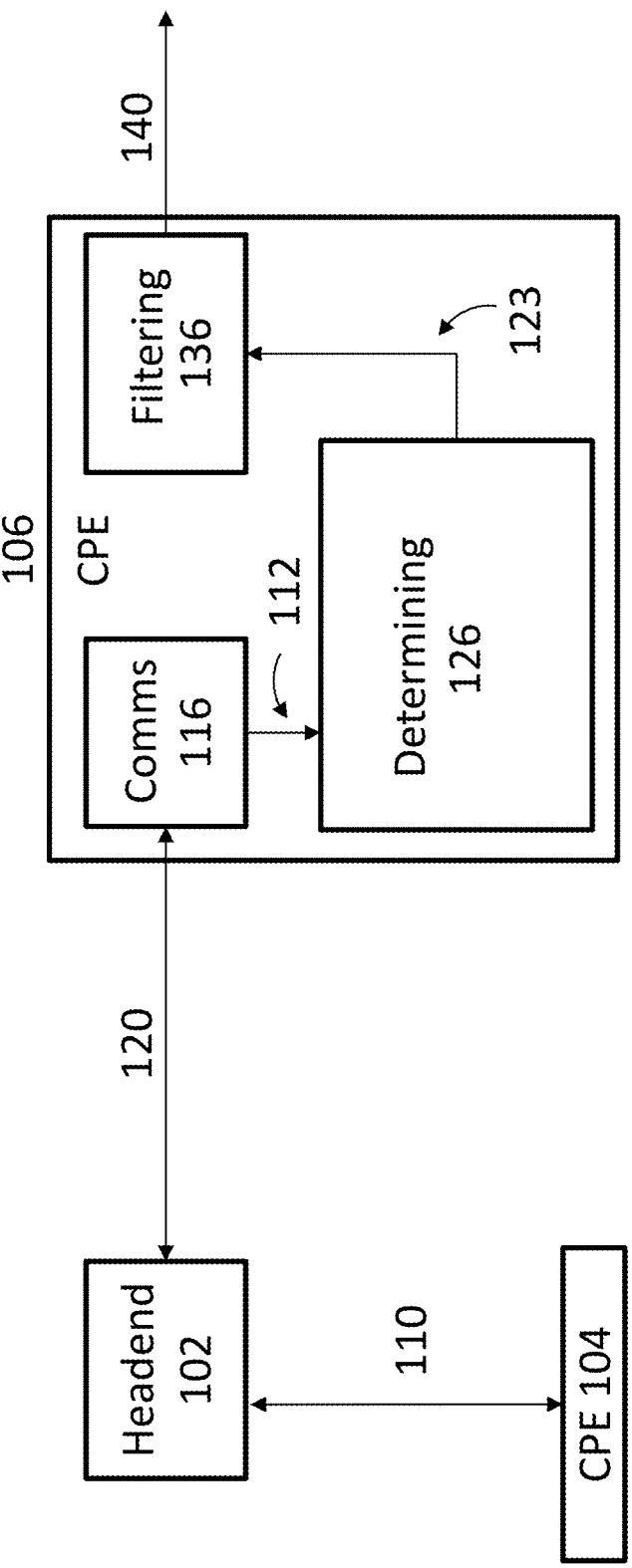
FIG. 1 illustrates a block diagram of a system with CPE devices and a headend in accordance with a first aspect of the present invention.

FIG. 1 illustrates a block diagram 100 of a CPE in accordance with a first aspect of the present invention.

As shown in the figure, block diagram 100 includes a headend 102, a CPE 104 and a CPE 106. CPE 104 does not have the advantage of the present invention, while CPE 106 does.

Headend 102 is operable to receive a IP media stream request from communication component 116, via bi-directional communication line 120. Headend 102 is additionally operable to transmit a chunk of a desired IP media stream, such as a headend user guide or targeted advertisement, to communication component 116, via bi-directional line 120, based on the received media stream request signal. Headend 102 is further operable to provide chunks of the IP media stream via well-known IP protocols, such as HTTP or DASH streaming.

CPE 104 is operable to transmit a user guide request to headend 102, via bi-directional communication link 110. CPE 104 is additionally operable to receive a headend guide media stream transmitted by headend 102, via bi-directional communication line 110. CPE 104 is further operable to parse the headend guide media stream in order to generate a user guide. Similarly, CPE 106 is operable to transmit a user guide request to the headend 102 over link 120 and receive user guide media streams from headend 102 via link 120. CPE 106 is further operable to parse the headend user guide media stream to generate a user guide while advantageously removing filler frames from the media stream.

One who is skilled in the art of headend to CPE communications would appreciate that communications links 110 and 120 could utilize one or more of the following technologies: hybrid fiber coax, DSL, fiber to the premise or wireless links, as are well known for communications between CPE devices and headend installations. One who is skilled in the art of CPE devices would also acknowledge that while the CPE devices 104 and 106 are shown as single units, their functionality might be divided among more than one device within the residence.

CPE 106 further includes a communication component 116, a determining component 126, and a filtering component 136.

In this example, communication component 116, determining component 126, and filtering component 136 are illustrated as individual components. However, in some embodiments, at least two of communication component 116, determining component 126, and filtering component 136 may be combined as a unitary device. Further, in some embodiments, at least one of communication component 116, determining component 126, and filtering component 136 may be implemented as non-transitory, tangible, computer-readable media having computer-readable instructions stored thereon, the computer-readable instructions being capable of being read by a computer and being capable of instructing the computer to perform a method of filtering a media stream to remove filler frames.

Communication component 116 is operable to transmit a first IP media stream request signal to headend 102, via bi-directional communication line 120, in order to request a first chunk of the IP media stream. Communication component 116 is operable to transmit a second request signal to headend 102, via bi-directional communication line 120, in order to request a second chunk of the IP media stream. Communication component 116 is further operable to provide the first chunk of the IP media stream to determining component 126, via line 112.

Determining component 126 is operable to receive a chunk of the IP media stream from communication component 116, via line 112. Determining component 126 is additionally operable to determine whether or not a chunk of the IP media stream contains one or more filler frames and generate a detected filler frame signal based on the detection of at least one filler frame. Determining component 126 is yet further operable to transmit the chunk of IP media stream and a detected filler frame signal to filtering component 136, via line 123.

Filtering component 136 is operable to receive the chunk of the IP media stream and a detected filler frame signal from determining component 126, via line 123. Filtering component 136 is additionally operable to remove detected filler frames based on the detected filler frame signal. Filtering component 136 is further operable to transmit the IP media stream without filler frames to be displayed and viewed by an end user, via line 140.

Figure 2:
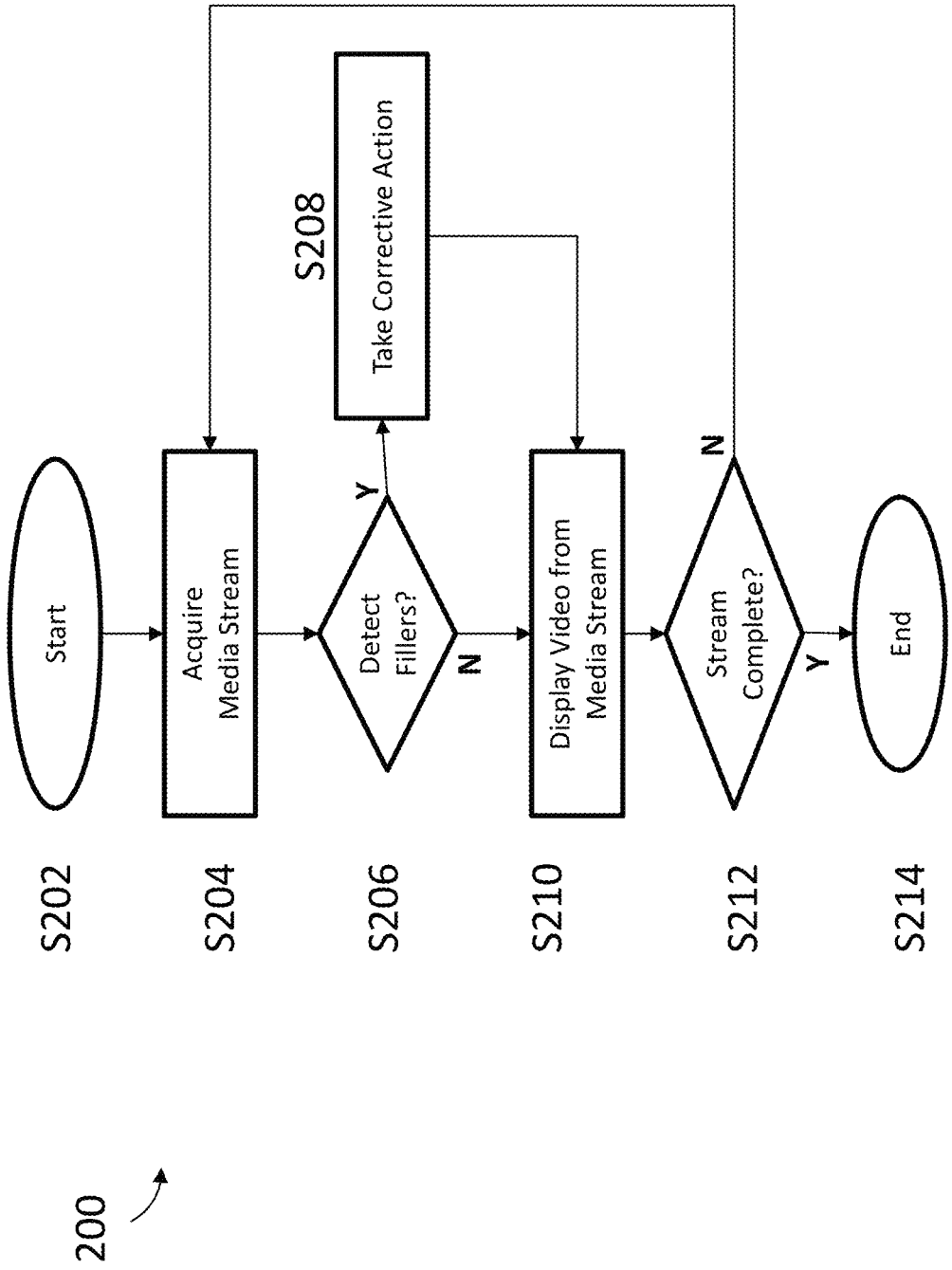
FIG. 2 illustrates a flowchart for the operation of a CPE in accordance with aspects of the present invention.

FIG. 2 illustrates an example method 200 for applying a corrective method to the process of acquiring and parsing IP media streams in accordance with a first aspect of the present invention.

As shown in FIG. 2, method 200 starts (S202), and the media stream is acquired (S204). This will now be described with additional reference to FIGS. 1-3.

Figure 3:
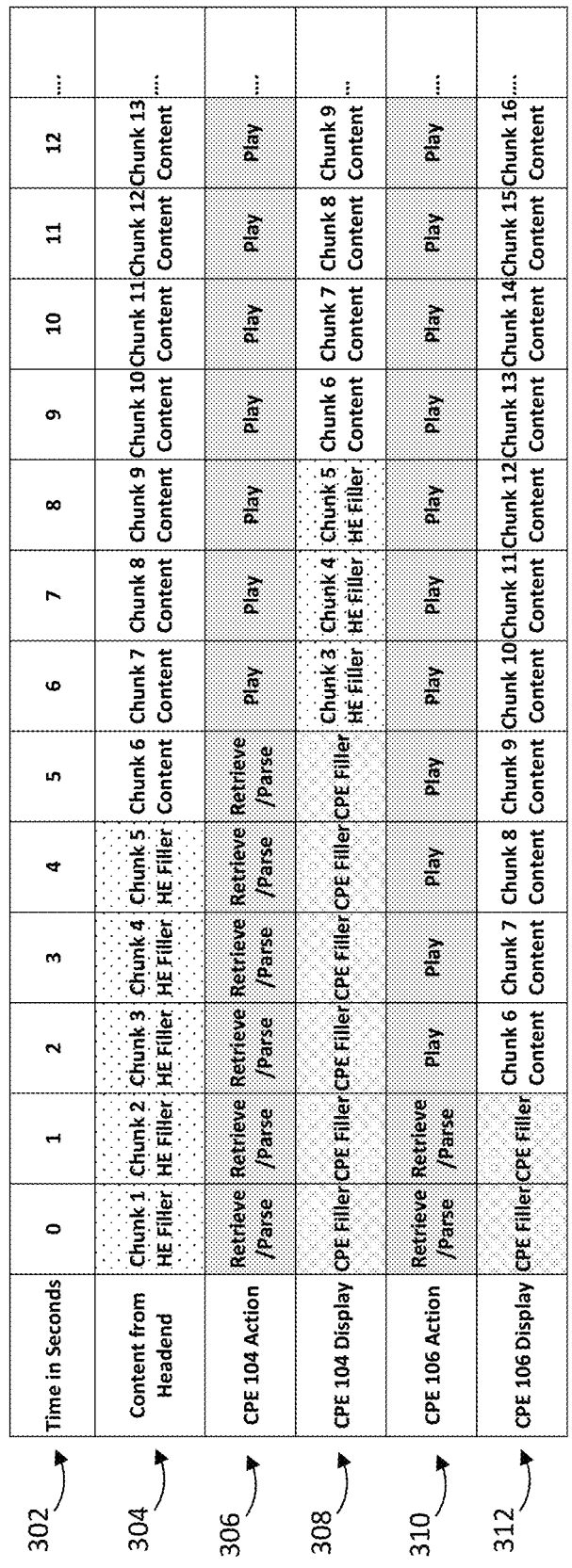
FIG. 3 illustrates a chart of a media stream presentation sequence in accordance with a first aspect of the present invention.

FIG. 3 illustrates a chart 300 of an IP media stream presentation sequence in accordance with a first aspect of the present invention.

As shown in the figure, chart 300 includes rows 302, 304, 306, 308, 310 and 312.

Row 302 represents time in seconds. Row 304 represents the chunked content available from the headend 102 for FIG. 1 for CPE 104 and 106. Row 306 represents the actions being taken by CPE 104 of FIG. 1 at the time of row 302. Row 308 represents the content displayed by CPE 104 at the time of row 302. Row 310 represents the actions being taken by CPE 106 of FIG. 1 at the time of row 302. Row 312 represents the content displayed by CPE 106 at the time of row 302.

Returning to FIG. 1, suppose that the end user of CPE 104 would like to watch content but is not sure of what content is currently available for view, they may wish to view a user guide that shows available content. In this case, the end user will direct CPE 104 to present the user guide. At this time, CPE 104 will request a user guide IP media stream from headend 102 in order to provide a guide for the end user.

Once headend 102 receives the headend guide request, it will prepare a chunked IP media stream file for CPE 104 and communicate the location of that file to CPE 104, typically in a manifest file. CPE 104 will then retrieve the first chunk of headend guide data, via bi-directional communication link 110. At zero seconds, CPE 104 retrieves the first chunk of the headend guide media stream, which it then begins to parse to create a guide that can be displayed to and viewed by an end user. At this time, since the analysis of the guide's media stream is not complete, it cannot be displayed or viewed by an end user. In some cases, CPE 104 is parsing the chunk for MPEG transport stream tables, such as the PAT and PMT, as are well-known in the art. CPE 104 may also be filling a jitter buffer to ensure stable playout once the stream playout begins. While the guide's buffer is incomplete, CPE 104 displays a CPE generated filler screen that will be seen by an end user.

In this example, CPE devices using headend 102 are known to lose up to 5 chunks before being able to correctly parse chunks to retrieve the desired media stream. To ensure that no CPE will lose any guide frames, headend 102 prepends the guide IP media stream with 5 chunks of filler frames, as shown in row 304 of FIG. 3.

After one second, CPE 104 fails to correctly parse the first chunk of the guide media stream. At this time, CPE 104 retrieves the next chunk of the guide media stream and then attempts to parse it to extract data that will be used to construct the media stream for display. The process of CPE 104 parsing a chunk of data and then retrieving the next chunk from headend 102 continues in the manner described above for until the MPEG TS has been parsed and the jitter buffer is full which takes six seconds in this example. CPE 104 requesting and parsing chunks of the guide media stream is represented by row 306 of FIG. 3.

After six seconds, CPE 104 finishes parsing the chunks of headend guide media stream and then proceeds to display the content to the end user. The media stream had contained five seconds of headend filler frames to compensate for lost chunks, but CPE 104 lost 2 of them so the end user sees the three seconds of headend filler frames before the desired content, the user guide, appears.

Returning to FIG. 1, suppose that the end user of CPE 106 similarly to the end user of CPE 104 would like to watch content but is not sure of what content is currently available for view, and the end user directs CPE 106 to present the user guide.

To pull guide data from headend 102, communication component 116 will transmit a guide IP media stream request to headend 102, via bi-directional line 120. Once the guide request signal is received, headend 102 will transmit information, such as a manifest file, to communication component 116 providing the location of a first chunk of headend guide data, via bi-directional line 120. Using the manifest, communication component 116 can retrieve at least a first chunk of the guide IP media stream from headend 102 over link 120.

Returning to FIG. 2, after at least a first chunk of the guide has been acquired (S204), it is determined whether at least one filler frame is detected (S206). For example, returning to FIG. 1, when communication component 116 receives at least the first chunk, it sends the chunk to determining component 126, via line 112.

Determining component 126 receives the first chunk of the headend guide media stream and parses it in order to begin reconstructing the desired guide media stream. While parsing the chunk, it checks to see if any frames within the chunk are associated with a filler frame. In one embodiment, determining component 126 can detect a filler frame by saving an initial frame within a chunk and comparing it to the next frame in a chunk. If the difference between the frames is minimal, determining component 126 can assume that they are both filler frames. In another embodiment, headend 102 can use filler frames containing a known signature or indication that allows determining component 126 to positively identify each frame as a filler frame or not. In embodiments, the known signature or indication may be a specific code embedded in a non-displayed portion of the frame or a well-known pattern within the displayed portion of the frame, such as a logo or distinctive pattern or color. In another embodiment, headend 102 may use metadata associated with the media stream to indicate to CPE 106 the starting and ending offset of the filler frames within the media stream, or the starting offset of the desired content within the media stream.

If no filler frame is detected (N at S206 in FIG. 2), then a guide media stream is prepared for display (S210). Suppose that in this example embodiment, determining component 126 finds that the first chunk of headend guide data does not contain any filler frames. In this case, determining component 126 generates a detected filler frame signal that will instruct filtering component 136 that the first chunk of headend guide data does not contain filler frames. At this time, determining component 126 transmits the detected filler frame signal and parsed guide media stream to filtering component 136, via line 123.

Filtering component 136 receives the detected filler frame signal and parsed guide media stream from determining component 126. Filtering component 136 analyzes the detected filler frame signal and finds that the parsed guide media steam does not contain filler frames. Since the parsed chunk does not contain frames associated with filler frames, filtering component 136, uses the chunk of guide media stream to begin providing the desired video of the use guide to the end user over communication link 140. Once finished processing the first chunk of the media stream, communication component 116 will request the next chunk of the media stream from headend 102.

If at least one filler frame is detected in a chunk (Y at S206), then corrective action is taken (S208). For example, returning to FIG. 1, determining component 126 parses the chunk of headend guide data and finds it contains at least one filler frame. Next, determining component 126 will generate a detected filler frame signal that will instruct filtering component 136 that the current chunk of headend guide data contains at least one filler frame. Once finished, determining component 126 transmits the detected filler frame signal and parsed chunk of guide media stream to filtering component 136, via line 123.

Filtering component 136 receives the detected filler frame signal and parsed chunk of guide media stream from determining component 126. Filtering component 136 analyzes the detected filler frame signal and finds that the associated chunk is associated with at least one filler frame. Filtering component 136 analyses the frames on the chunk and drops any filler frames.

Returning to FIG. 2, after corrective action is taken (S208), the guide media stream video is constructed for display. At this time, filtering component 136 will transmit the completed guide so that it may be displayed (S210) and viewed by an end user, via line 140.

The process of dropping frames by filtering component 136 will continue in this manner until the media stream transmission is complete as determined in (S212). In operation, for example, the stream will no longer be needed by CPE 106 when the end user elects to view a program from the guide. At this point, process 200 ends (S214).

Returning to FIG. 3, row 312 illustrates the resulting content displayed to the end user by CPE 106 using the advantageous method of FIG. 2. Instead of the prior experience with, for example, CPE 104, the end user of CPE 106 receives the desired content much more quickly.

Figure 4:
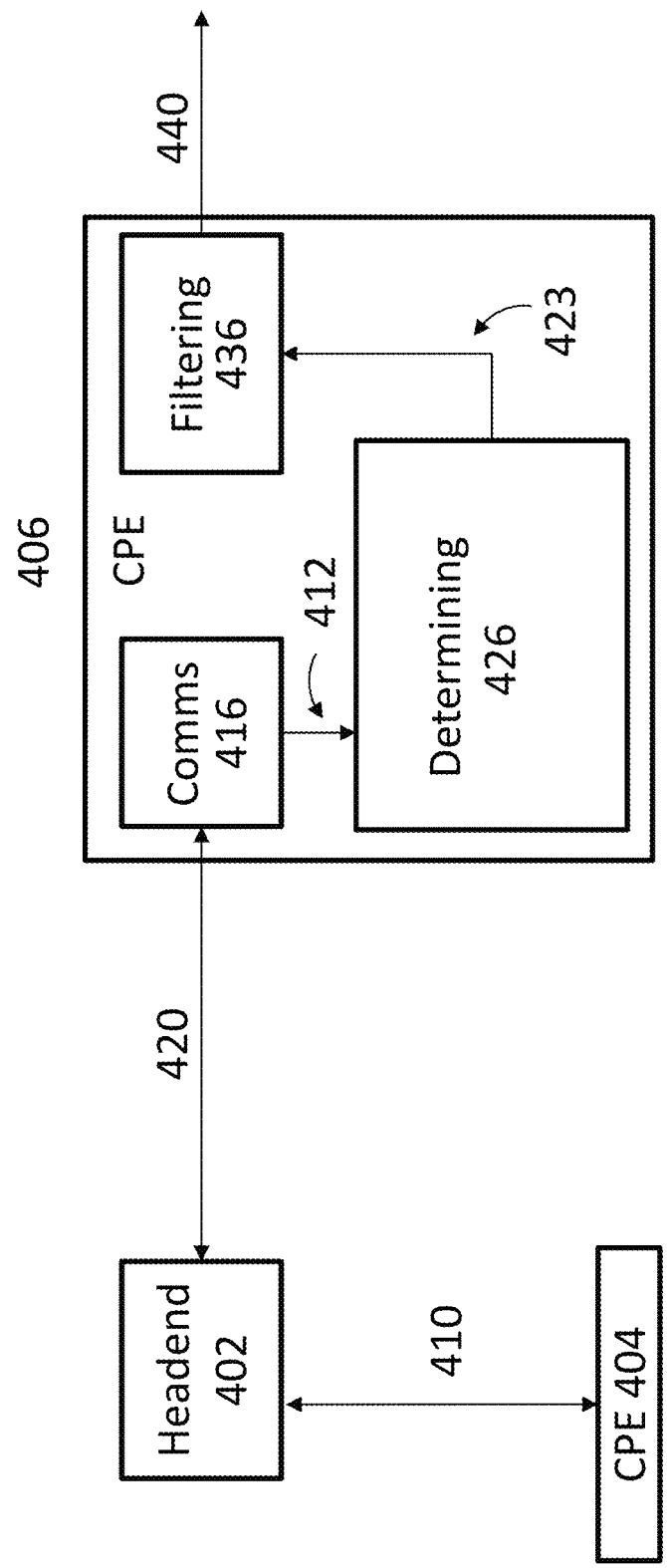
FIG. 4 illustrates a block diagram of a system with CPE devices and a headend in accordance with a second aspect of the present invention.

An alternate use of method 200 of FIG. 2 is now described with additional reference to FIG. 4 and FIG. 5.

FIG. 4 illustrates a block diagram 400 of a CPE in accordance with a second aspect of the present invention.

As shown in the figure, block diagram 400 includes a headend 402, a CPE 404 and a CPE 406. CPE 404 does not have the advantage of the present invention, while CPE 406 does.

Headend 402 is operable to receive a user guide request from CPE 404 via bidirectional communications link 410 and transmit a user guide media stream to CPE 404 via link 410. Headend 404 is further operable to receive a user guide request from CPE 406 via bidirectional communications link 420 and transmit a user guide media stream to CPE 406 via link 420.

CPE 404 is operable to transmit a user guide request to the headend 402 over link 410 and receive a user guide media stream from headend 402 via link 410. CPE 406 is operable to transmit a user guide request to the headend 402 over link 420 and receive user guide media streams from headend 402 via link 420. CPE 406 is further operable to parse the headend user guide media stream to generate a user guide while advantageously removing filler frames from the media stream.

CPE 406 further includes a communication component 416, a determining component 426, and a filtering component 436.

In this example, communication component 416, determining component 426, and filtering component 436 are illustrated as individual components. However, in some embodiments, at least two of communication component 416, determining component 426, and filtering component 436 may be combined as a unitary device.

Further, in some embodiments, at least one of communication component 416, determining component 426, and filtering component 436 may be implemented as non-transitory, tangible, computer-readable media having computer-readable instructions stored thereon, the computer-readable instructions being capable of being read by a computer and being capable of instructing the computer to perform a method of filtering a media stream to remove filler frames.

Communication component 416 is operable to transmit a user guide request to headend 402, via bi-directional communication line 420. Communication component 416 is further operable to tune to the channel that will carry the headend-generated media stream. The process of tuning a CPE receiver, such as that comprised in communication component 416 is well-known and will not be discussed herein. After the tuning process is complete, communication component 416 is further operable to provide incoming frames of the user guide media stream to determining component 426, via link 412.

Determining component 426 is operable to receive incoming frames of the user guide media stream from communication component 416, via line 412. Determining component 426 is additionally operable to determine whether or not the incoming frames of the media stream include one or more filler frames and generate a detected filler frame signal based on the detection of at least one filler frame. Determining component 426 is yet further operable to transmit the incoming frames of the media stream and a detected filler frame signal to filtering component 436, via line 423.

Filtering component 436 is operable to receive frames of the user guide media stream and a detected filler frame signal from determining component 426, via line 412. Filtering component 436 is additionally operable to remove detected filler frames based on the detected filler frame signal. Filtering component 436 is further operable to transmit the user guide media stream with filler frames removed to be displayed and viewed by an end user, via line 440.

FIG. 5 illustrates a chart 500 of a media stream presentation sequence in accordance with a second aspect of the present invention.

As shown in the figure, chart 500 includes rows 502, 504, 506, 508, 510 and 512.

Row 502 represents time in seconds. Row 504 represents the content sent from the headend 402 of FIG. 4 at the time of row 502. Row 506 represents the actions being taken by CPE 404 of FIG. 4 at the time of row 502. Row 508 represents the content displayed by CPE 404 at the time of row 502. Row 510 represents the actions being taken by CPE 406 of FIG. 4 at the time of row 502. Row 512 represents the content displayed by CPE 406 at the time of row 502.

In operation, suppose that an end user signs up for cable service and receives as a set top box CPE 404, where CPE 404 is an older model and a second end user receives CPE 406 for their cable service. If the end users would like to watch content but are not sure of what content is currently available for view, they may wish to view a user guide showing available content. To that end, the end users will direct CPE 404 and CPE 406 respectively to display a user guide.

At this time, CPE 404 and CPE 406 will communicate with headend 402 to request the user guide. The process of CPE 404 and CPE 406 retrieving their respective user guides will now be described with additional reference to FIG. 5.

Referring briefly back to FIG. 4, CPE 404 will transmit a guide media stream request to headend 402, via bi-directional communication link 410. Once headend 402 receives the user guide request from CPE 404, it will begin transmitting the user guide on link 410 and notify CPE 404 of at least the correct channel and Program ID of the user guide.

Referring now to FIG. 5, note that because older models of CPE are present, including CPE 404, headend 402 includes eight headend filler frames before the guide frames begin to ensure that the guide frames are not lost. CPE 404 is working to acquire the user guide media stream from headend 402 beginning at time 0 as shown in row 506. The process of media stream acquisition may include RF channel tuning and synchronization, MPEG transport stream acquisition and other steps well known in the art. CPE 404 completes channel acquisition and begins buffering content in its jitter buffer. During channel acquisition and buffering, CPE 404 displays a CPE generated filler screen to the user. Once the buffering process is complete, CPE 404 begins playout from the buffer which includes 2 seconds of headend-generated filler frames before it begins playing the guide frames. CPE 404 displays the user guide after ten seconds as shown in row 508.

Returning to CPE 406, once an end user directs CPE 406 to display the user guide, CPE 406 will transmit a guide media stream request to headend 402, via bi-directional communication link 420 (S202 of FIG. 2). Once headend 402 receives the user guide request from CPE 406, it will begin transmitting the user guide media stream to CPE 406 on link 420 and notify CPE 406 of at least the correct channel and Program ID of the user guide.

Communication component 416 works to acquire the user guide media stream from headend 402 beginning at time 0 as shown in row 510 (S204 of FIG. 2). The process of media stream acquisition may include RF channel tuning and synchronization, MPEG transport stream acquisition and other steps well known in the art. Communication component 416 completes channel acquisition and buffers content in its jitter buffer to pass to determining component 426 over link 412. During channel acquisition and buffering, CPE 406 displays a CPE generated filler screen to the user.

Determining component 426 receives the buffered frames of the headend guide media stream and parses them in order to begin reconstructing the desired guide media stream. While parsing the frames, it checks to see if any frames within the buffer are associated with a filler frame including the embodiments discussed earlier of frame inspection for implicit and explicit signatures and metadata inspection.

If no filler frame is detected (N at S206 in FIG. 2), then a guide media stream is prepared for display (S210). Suppose that in this example embodiment, determining component 426 does not find any filler frames in the buffer. In this case, determining component 426 generates a detected filler frame signal that will instruct filtering component 436 that the current buffer does not contain any filler frames. At this time, determining component 426 transmits the detected filler frame signal and parsed guide media stream to filtering component 436, via line 423.

Filtering component 436 receives the detected filler frame signal and parsed buffered guide media stream from determining component 426. Filtering component 436 analyzes the detected filler frame signal and finds that the parsed guide media steam does not contain filler frames. Since the parsed frames do not contain frames associated with filler frames, filtering component 436, uses the frames of the guide media stream to begin providing the desired video of the user guide to the end user over communication link 440. The process of CPE 406 receiving frames of the guide media stream will continue in this manner until the end user leaves the guide (S212-S214).

If at least one filler frame is detected in a chunk (Y at S206), then corrective action is taken (S208). Referring to FIG. 5, for purposes of discussion, suppose that the slowest CPE in the field requires eight seconds to reliably parse and construct a guide video output. In this case, even though CPE 406 can acquire the user guide channel and fill its jitter buffer in 4 seconds, it still receive 8 seconds of HE filler frames.

Returning back to FIG. 4, CPE 406 receives frames of the headend guide media stream associated with a filler frame through communication component 416. Communication component 416 then sends the frames to determining component 426. Determining component 426 examines the headend guide frames in the buffer and finds at least one filler frame. Next, determining component 426 generates a detected filler frame signal that will instruct filtering component 436 that the current buffer of headend guide frames contains at least one filler frame. Once finished, determining component 426 transmits the detected filler frame signal and the guide media stream frames to filtering component 436, via line 423.

Filtering component 436 receives the detected filler frame signal and the guide media stream frames from determining component 426. Filtering component 436 analyzes the detected filler frame signal and finds that current buffered frames are associated with at least one filler frame. Filtering component 436 analyses the buffered frames and drops any filler frames.

Returning to FIG. 2, after corrective action is taken (S208), the guide media stream video is constructed, if possible. If the filler frames are not yet available, CPE 406 will continue to display CPE filler frames as seen in row 512. The process of dropping frames by filtering component 836 will continue in this manner until filler frames are not found in the frames transmitted by headend 502 and the desired content has begun (S210). When the user tunes away from the guide channel, process 200 ends (S214).

Returning to FIG. 5, row 512 illustrates the resulting content displayed to the end user by CPE 406 using the advantageous method of FIG. 2. CPE 406 continues to display CPE filler screens until the guide media stream is detected. Instead of the prior experience with, for example, CPE 404, the end user of CPE 406 receives the desired content more quickly.

Figure 6:
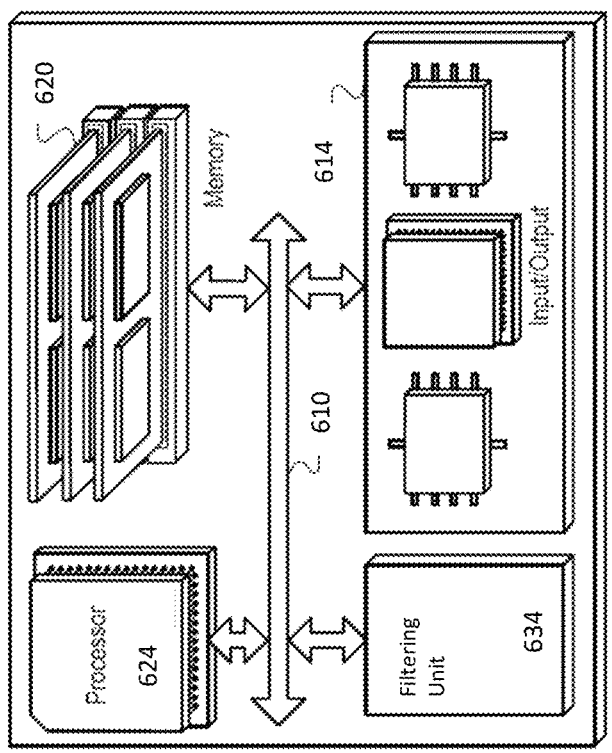
FIG. 6 illustrates a block diagram of potential instantiation of a CPE in accordance with the first or second aspect of the invention.

FIG. 6 is a block diagram of a hardware configuration 600 operable to provide improved performance in the delivery of headend-sourced media streams. Hardware configuration 600 may include a processor 624, a memory 620, a filtering unit 634, and an input/output device 614. Each of the components 624, 620, 634, and 614 may, for example, be interconnected using a system bus 610. Note that a system bus is a common way of providing communication links between system units, such as communications link 112 and 123 in CPE 104. Processor 624 may be capable of processing instructions for execution within hardware configuration 600. In one implementation, processor 624 may be a single-threaded processor. In another implementation, processor 624 may be a multi-threaded processor. Processor 624 may be capable of processing instructions stored in memory 620. Processor 624 may be capable of determining whether a received frame is a filler frame, for example.

Memory 620 may store information within hardware configuration 600, such as buffered media stream chunks or buffered individual frames. In one implementation, memory 620 may be a computer-readable medium. In one implementation, memory 620 may be a volatile memory unit. In another implementation, memory 620 may be a non-volatile memory unit. In yet another implementation, memory 620 could be a combination of both volatile and non-volatile memories.

In some implementations, filtering unit 634 may be capable of filtering media streams for hardware configuration 600. In one implementation, filtering unit 634 may be capable of providing display generation capabilities for hardware configuration 600 as well as filtering. In various different implementations, filtering unit 634 may, for example, comprise a single chip implementation. In other implementations, filtering unit 634 may be a multi-chip module. In still other implementations, filtering unit 634 may be integrated within processor 624.

Input/output device 614 provides input/output operations for hardware configuration 1000. In one implementation, input/output device 614 may include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 interface), and/or one or more interfaces for outputting video and/or data services to a CPE device (e.g., CPE 106 of FIG. 1, cable set top box, tablet, wireless extender, or other client device). In another implementation, input/output device 614 may include driver devices configured to send communications to and receive communications from one or more headends over a communications link (e.g., headend 102 of FIG. 1, communication link 120 of FIG. 1, etc.).

Those skilled in the art will appreciate that the invention described herein improves upon methods and systems for providing improved delivery of headend-sourced media streams. The subject matter of this disclosure, and components thereof, may be realized by instructions that upon execution cause one or more processing devices to carry out the processes and functions described above. Such instructions may, for example, comprise interpreted instructions, such as script instructions, e.g., JavaScript or ECMAScript instructions, or executable code, or other instructions stored in a computer readable medium.

Implementations of the subject matter and the functional operations described in this specification may be provided in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a tangible program carrier for execution by, or to control the operation of, data processing apparatus.

A computer program (also known as a program, software, software application, script, or code) may be written in any form of programming language, including compiled or interpreted languages, or declarative or procedural languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows may also be performed by, and apparatus may also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory may be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter described in this specification have been described. Other embodiments are within the scope of the following claims. For example, the actions recited in the claims may be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

In summary, a problem with the current system and method for providing a headend-sourced media stream to an end user is that the use of filler frames is required, which is undesirable due to the perceived slowness and lag. Since newer generations of CPE are able to acquire and process chunks of a media stream from a headend much faster than older generations of CPE, the ability to remove filler frames is needed.

The present invention provides a system and method that is able to remove filler frames for varying types of media delivery. First, a CPE will obtain a media stream from a headend provider and in the next part, determine whether the provided media stream frames are associated with a filler frame. Next, if it is detected that the media stream is associated with a filler frame, the filler frame is removed and the completed media stream can be displayed to an end user in a final part.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. An apparatus for use with a headend media stream provider, said apparatus comprising:
    a communication component operable to request a media stream from the headend media stream provider, the media stream comprising a plurality of frames;
    a determining component operable to receive the requested media stream, unmodified, from the communication component and determine whether at least one frame of the acquired frames of the media stream corresponds to a filler frame, the filler frame being a frame inserted into the media stream by the headend media stream provider so as to prepend the media stream; and
    a filtering component operable on the unmodified media stream to remove at least one frame from the unmodified media stream determined to correspond to a filler frame and transmit a filtered media stream for display, the filtered media stream comprising the unmodified media stream without the removed at least one frame.

2. The apparatus of claim 1 further comprising,
    wherein requesting the media stream includes requesting at least a chunk of the media stream,
    wherein if the chunk of the media stream includes at least one filler frame, then the chunk includes filler frame identifying data therein, and
    said determining comprises detecting the filler frame identifying data within the chunk.

3. The apparatus of claim 2 wherein the filler frame identifying data comprises a known content signature within at least one frame.

4. The apparatus of claim 1 further comprising,
    wherein requesting the media stream includes requesting at least a chunk of a media stream,
    wherein the chunk of the media stream includes metadata associated with filler frames, and
    wherein said determining component is operable to determine whether at least one frame of the chunk of the media stream corresponds to a filler frame based on the metadata.

5. The apparatus of claim 4, wherein the chunk of the media stream includes metadata associated with a starting offset of filler frames within the media stream or within the chunk.

6. The apparatus of claim 5, wherein the chunk of the media stream includes metadata additionally associated with an ending offset of filler frames within the media stream or within the chunk.

7. The apparatus of claim 1, wherein said determining component comprises a comparator component operable to generate a comparison indication signal based on a comparison of a first frame within a chunk of the media stream with a second frame of the chunk, and wherein said filtering component is operable to remove at least the first and second frames of the chunk of the media stream based on the comparison indication signal.

8. A method of using customer premises equipment with a headend media stream provider, said method comprising:
requesting, via a communication component, a media stream from the headend media stream provider;
pulling, via the communication component, a chunk of unmodified media stream, the chunk of the unmodified media stream comprising at least a plurality of frames;
transmitting the chunk of the unmodified media stream to a determining component;
determining, via the determining component, whether at least one of the frames of the chunk corresponds to a filler frame, the filler frame being a frame inserted into the media stream by the headend media stream provider so as to prepend the media stream;
removing, via a filtering component, the one or more frames corresponding to filler frames; and
transmitting, via the filtering component, a filtered media stream for display, the filtered media stream comprising the unmodified media stream without the removed one or more frames.

9. The method of claim 8 further comprising:
wherein if at least one frame of the media stream chunk corresponds to a filler frame, then the chunk includes filler frame identifying data therein, and
wherein when the chunk includes filler frame identifying data therein, said determining, via a determining component, comprises detecting the filler frame identifying data within the chunk of the media stream.

10. The method of claim 8, wherein the chunk of the media stream includes metadata associated with filler frames, and wherein the determining component is operable to determine whether at least one frame of the chunk of the media stream is associated with filler frames based on the metadata.

11. The method of claim 10, wherein the metadata indicates a starting offset of filler frames within the media stream or the chunk.

12. The method of claim 11, wherein the metadata additionally indicates an ending offset of filler frames within the media stream or the chunk.

13. The method of claim 8 further comprising,
wherein said determining, via a determining component, comprises generating, via a comparator component, a comparison indication signal based on a comparison of the first frame of media stream chunk with the second frame of the media stream chunk, and
wherein said removing, via a filtering component, comprises removing, via the filtering component, said first frame based on the comparison indication signal.

14. A non-transitory, tangible, computer-readable media having computer-readable instructions stored thereon, the computer-readable instructions being capable of being read by an apparatus in use with a headend media stream provider and being capable of instructing the apparatus to perform the method comprising:

requesting, via a communication component, a media stream from the headend media stream provider;
pulling, via the communication component, a chunk of unmodified media stream, the chunk of the unmodified media stream comprising at least a frame associated with an image;
transmitting the chunk of the unmodified media stream to a determining component;
determining, via the determining component, whether at least one frame of the chunk corresponds to a filler frame, the filler frame being a frame inserted into the media stream by the headend media stream provider so as to prepend the media stream;
removing, via a filtering component, at least one frame from the chunk when that frame corresponds to a filler frame; and
transmitting, via the filtering component, a filtered media stream for display, the filtered media stream comprising the unmodified media stream without the removed at least one frame.

15. The non-transitory, tangible, computer-readable media of claim 14, wherein the computer-readable instructions further comprise:
wherein if the chunk of the media stream includes at least one filler frame, then the chunk includes filler frame identifying data therein, and
said determining, via a determining component, comprises detecting the filler frame identifying data within the chunk.

16. The non-transitory, tangible, computer-readable media of claim 14, wherein the computer-readable instructions are capable of instructing the apparatus to perform the method wherein the chunk of the media stream includes metadata associated with filler frames, and wherein said determining, via a determining component, comprises identifying the metadata associated with filler frames.

17. The non-transitory, tangible, computer-readable media of claim 16, wherein the chunk of the media stream includes metadata associated with a starting offset of filler frames within the chunk or the media stream.

18. The non-transitory, tangible, computer-readable media of claim 16, wherein the chunk of the media stream includes the metadata associated with an ending offset of filler frames within the chunk or the media stream.

19. A filter for a headend media stream provider, comprising:
a filter component operable to receive a chunk of unmodified media stream, wherein the chunk of the unmodified media stream includes at least an indicator of the presence of filler frames in the chunk of unmodified media stream, the filter component further operable in the unmodified media stream to remove a frame of the chunk corresponding to a filler frame and transmit a filtered media stream for display, the filler frame being a frame inserted into the media stream by the headend media stream provider so as to prepend the media stream, and the filtered media stream comprising the unmodified media stream without the removed frame.

* * * * *